United States Patent Office 3,441,830
Patented Apr. 29, 1969

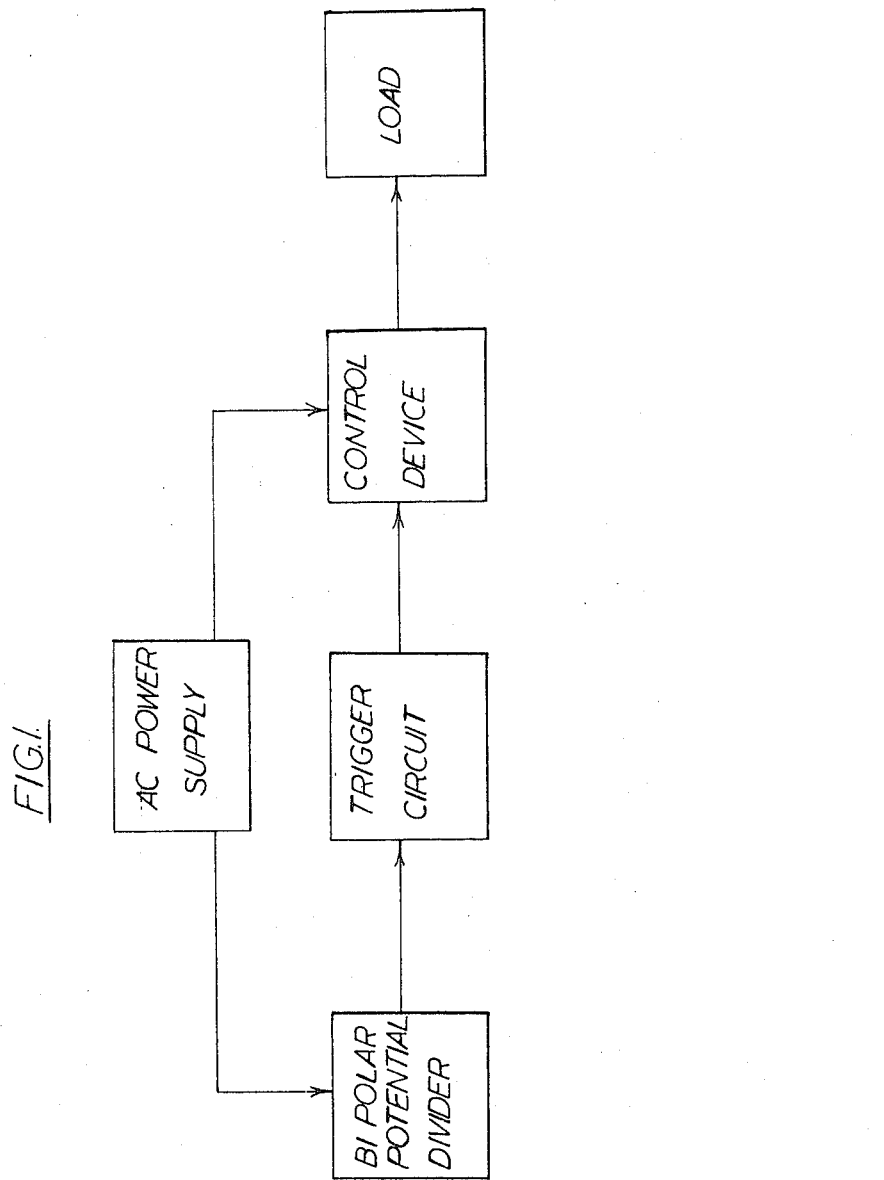

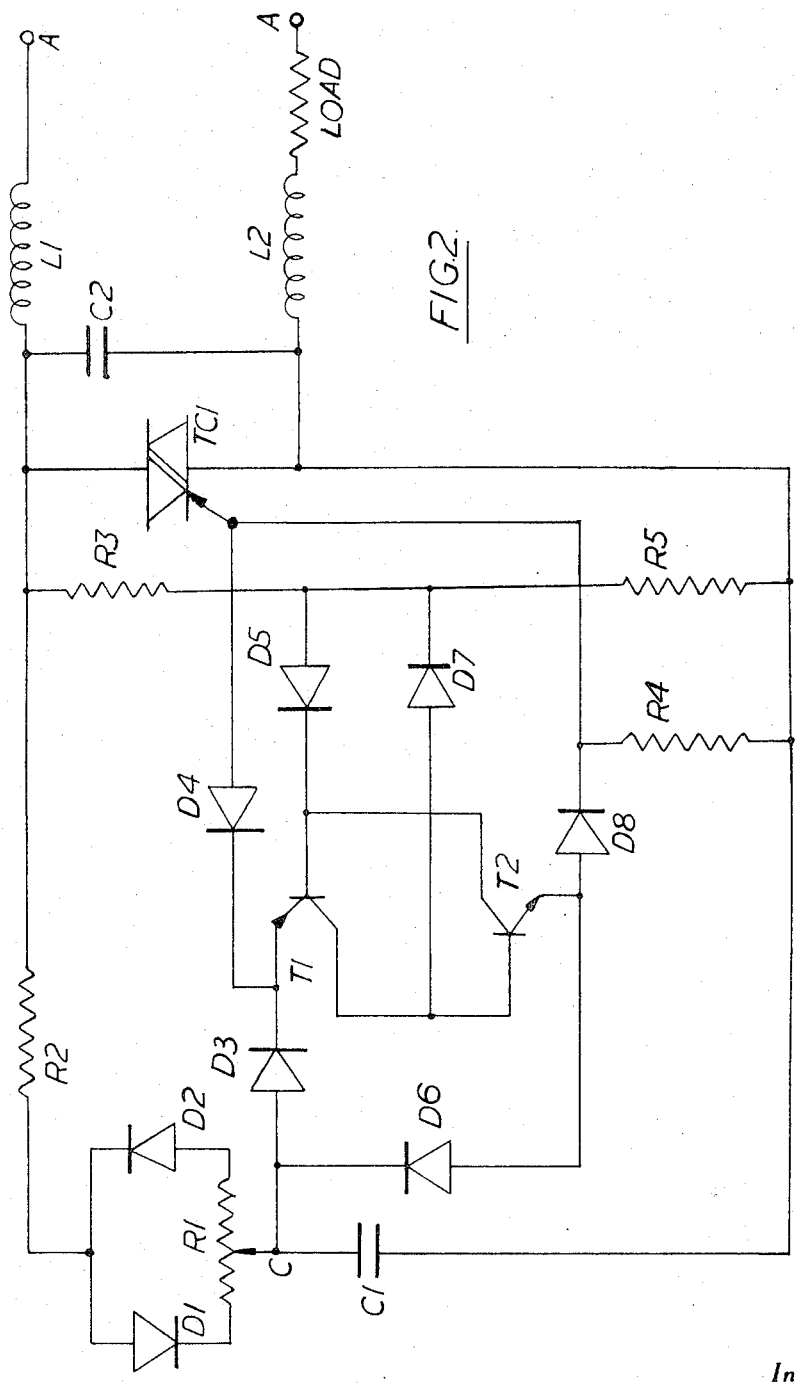

3,441,830
ADJUSTABLE BIPOLAR POWER SUPPLY
Geoffrey Duddridge, Aldwych, London, England, assignor to International Standard Electric Corporation, New York, N.Y., a corporation of Delaware
Filed Nov. 26, 1965, Ser. No. 509,782
Claims priority, application Great Britain, Dec. 2, 1964, 48,965/64
Int. Cl. H02m 7/78
U.S. Cl. 321—43                               5 Claims

ABSTRACT OF THE DISCLOSURE

An A.C. source voltage fed to a bipolar potential divider circuit provides signals of either polarity depending upon the setting. The output of the divider circuit controls a trigger circuit to give trigger signals on alternate half cycles, timing being determined by polarity of the divider circuit output. The trigger signals place a five-layer semiconduction device, interrelating the load and A.C., into conduction.

---

This invention relates to bidirectional power supplies.

It is an object of the invention to provide means for supplying to a load a direct current of either polarity derived from an alternating current power supply.

According to the present invention there is provided a control circuit for operation from an alternating current power supply comprising a trigger-operated control device, means for deriving a control potential of either polarity, and means for triggering said control device in response to said control potential, wherein said control device comprises a bi-directional five-layer semiconductor device, for deriving a direct current from said alternating current power supply and for supplying the direct current to a load in response to signals from said triggering means.

In order that the invention may be better understood, an embodiment of it will now be described with reference to the accompanying drawings in which:

FIGURE 1 shows a schematic layout of the elements of the embodiment.

FIGURE 2 shows in detail the circuit according to one embodiment of the invention.

As shown in FIGURE 1, an alternating current power supply feeds into a bipolar potential divider circuit from which is derived a voltage whose magnitude and polarity may be controlled. The potential divider circuit controls a trigger circuit which gives an output signal on alternate half cycles of the alternating current supply voltage, the timing of these signals being determined by the polarity of the output from the potential divider. The trigger circuit controls the firing of a control device which, when in the conducting state, supplies power to the load.

Referring now to FIGURE 2, the bipolar potential divider comprises similar diodes D1 and D2, resistors R1 and R2 and capacitor C1. An alternating voltage applied between the terminals AA and appearing across the terminals AA will give rise to a direct voltage across the capacitor C1. The magnitude and polarity of this direct voltage will be determined by the setting of R1, it being zero when both halves of the resistance network are equal.

According to the polarity of the direct voltage across C1 trigger signals are provided by transistor T1 in combination with gating diodes D3, D4 and D7 or transistor T2 in combination with gating diodes D6, D5 and D8. These trigger signals are then supplied to a bi-directional five-layer semiconductor device TC1 which controls the supply of current to the load. The circuit L1, L2, and C2 serves to smooth the rectifier current supplied to the load and limit the peak current through the thyristor. The five-layer device may, for example, be a three-terminal bi- directional thyristor such as is described in our co-pending United Kingdom Patent No. 1,030,670.

In the operation of the circuit of FIGURE 2, different results are obtained depending upon the polarity of the input voltage at AA and the average charge on capacitor C1.

In describing the operation, it is assumed that the side of the capacitor C1 opposite point C is a point of reference potential. Thus, if the average potential of point C is positive, point C will be positive when the input voltage at AA is zero. In this case, diodes D4, D5, and D6 will be back biased. Diodes D3, D7, and D8 will be forward biased. T1 will be cut off because of the large voltage drop across the back biased diode D5. Therefore, T2 will also be cut off.

When point C is positive and upper point A is positive (positive half cycle), D5 will be forward biased. T1 and T2 will then saturate to fire TC1.

When point C is positive and upper point A is negative, the back bias on D5 will simply be increased; and T1 and T2 will remain cut off. Therefore, TC1 will not fire.

When point C is negative and the input voltage is zero, diodes D3, D5, and D8 will be back biased. Diodes D4, D6, and D7 will be forward biased. T1 will receive a forward collector-emitter voltage through D4 and D7. However, T1 will be cut off again, as before, because of the large voltage drop across the back biased diode D5. Therefore, T2 will also be cut off.

When point C is negative and upper point A is negative, D5 will be forward biased; and T1 will saturate as before. T2 will also saturate through diodes D5 and D6. This will cause TC1 to fire.

When point C is negative and upper point A is positive, D5 will again be simply further back biased; and TC1 will not fire.

Diode D3 provides a forward emitter voltage when point C is positive and effectively disconnects the emitter when point C is negative.

Diode D4 provides a forward voltage to the emitter of T1 when point C is negative and effectively disconnects the emitter when point C is positive.

Diode D5 provides the pulse triggering and switching action as described previously.

Diode D6 isolates the emitter of T2 when point C is positive and provides a return for the emitter when point C is negative.

Diode D7 is employed to isolate the collector of T1 and the base of T2 when D7 becomes back biased.

Diode D8 isolates the emitter of T2 when point C is negative and provides a return for the emitter when point C is positive.

It will be appreciated that various modifications may be made without departing from the scope of the invention. For example, the trigger circuit may include two complementary four-layer devices in place of the arrangement of transistors and gating diodes. Alternatively, a five-layer device or an arrangement of gating diodes and avalanche transistors may be used.

Furthermore a complementary pair of four-layer devices may be used instead of the five-layer device TC1. Finally it is not necessary that the control devices be triggered using a gating electrode, as the circuit may quite easily be modified to provide a series trigger voltage for two-terminal devices.

Circuits as described above are particularly useful for the control of the speed D.C. motors without loss of torque. In particular, in this application, the ability to reverse the direction of rotation of the motor by means of a single simple continuous control without having to recourse to throwing a switch is advantageous. One aspect of this application for which this is extremely useful is the control of model railway trains.

It is to be understood that the foregoing description of specific examples of this invention is made by way of example only and is not to be considered as a limitation on its scope.

What I claim is:

1. A bi-polar, variable, direct-current power supply, said power supply comprising: a source of alternating voltage having two output terminals, a first circuit connected from said source; a switch in said first circuit having switching electrodes connected in series to open and to close said first circuit from said source to a load, said switch also having a gate; and adjustable means responsive to the output of said source for applying pulses to said gate of a predetermined magnitude and polarity, said magnitude being variable by varying the setting of said adjustment means, said polarity being reversible by varying the setting of said adjustment means, all of said pulses being of the same polarity at one time.

2. The invention as defined in claim 1, wherein said first circuit includes a first inductor connected from one source terminal to one side of said switch, the other source terminal being adapted for connection to one side of a load, a second inductor connected from the other switch electrode and adapted for connection with the other side of the load, said first circuit including a first capacitor connected between said switching electrodes, said switch including a five layer bidirectional semiconductor device.

3. The invention as defined in claim 2, wherein said adjustable means includes a second circuit having a first resistor connected from one switching electrode, a potentiometer having a winding and a wiper, first and second diodes connected respectively from the ends of said winding to said first resistor, and a second capacitor connected from said wiper to the other switching electrode, said first and second diodes being poled in opposite directions.

4. The invention as defined in claim 3, wherein said adjustable means includes a third circuit, said third circuit including two pairs of first and second diodes connected serially from said wiper to said gate, the diodes of each pair being poled in opposite directions, each of said first diodes also being poled in opposite directions, first and second transistors each having a collector, an emitter and a base, a voltage divider including two resistors connected between said switching electrodes, first and second auxiliary diodes connected from one corresponding base to the mutual junction of said two resistors, said auxiliary diodes being poled in opposite directions, one of said transistors being a PNP type and the other being an NPN type, the auxiliary diode connected to PNP type transistor being poled in a direction toward the base thereof, the emitter of said PNP type transistor being connected to the junction of one pair of said first and second diodes wherein said first diode of said one pair is poled in a direction toward the emitter of said PNP type transistor, the emitter of said NPN type transistor being connected to the junction of the other pair of said first and second diodes, the collector of each transistor being connected to the base of the other transistor.

5. The invention as defined in claim 1, wherein said adjustable means includes a second circuit having a first resistor connected from one switching electrode, a potentiometer having a winding and a wiper, first and second diodes connected respectively from the ends of said winding to said first resistor, and a second capacitor connected from said wiper to the other switching electrode, said first and second diodes being poled in opposite directions.

References Cited

UNITED STATES PATENTS

| | | |
|---|---|---|
| 3,196,330 | 7/1965 | Moyson. |
| 3,210,641 | 10/1965 | Hutson. |
| 3,266,021 | 8/1966 | Druz et al. _____ 307—88.5 XR |
| 3,310,687 | 3/1967 | Howell _____ 307—88.5 |
| 3,312,862 | 4/1967 | Currin _____ 317—33 XR |
| 3,320,519 | 5/1967 | Morgan. |
| 3,344,311 | 9/1967 | Nuckolls _____ 323—22 |
| 3,360,713 | 12/1967 | Howell _____ 323—22 |

JOHN F. COUCH, *Primary Examiner.*

W. M. SHOOP, JR., *Assistant Examiner.*

U.S. Cl. X.R.

321—47; 323—22; 307—305